June 29, 1965     I. EPSTEIN     3,191,370
GRASS COLLECTOR FOR A LAWNMOWER

Filed June 5, 1964     2 Sheets-Sheet 1

INVENTOR.
ISIDORE EPSTEIN

BY his    ATTORNEYS

June 29, 1965  I. EPSTEIN  3,191,370
GRASS COLLECTOR FOR A LAWNMOWER
Filed June 5, 1964  2 Sheets-Sheet 2

INVENTOR.
ISIDORE EPSTEIN
BY
his ATTORNEYS 3,191,370
GRASS COLLECTOR FOR A LAWNMOWER
Isidore Epstein, New Hyde Park, N.Y., assignor to G. W. Davis Corporation, Richmond, Ind., a corporation of Indiana
Filed June 5, 1964, Ser. No. 372,994
2 Claims. (Cl. 56—202)

This application is a continuation-in-part of my copending application Serial No. 312,923, filed on October 1, 1963.

This invention relates in general to rotary mowers and, more particularly, to improvements in means for collecting material discharged from a rotary mower.

Specifically, this device discloses a rotary mower having a blade casing with an exiting area to the rear of the casing and a platform for holding grass or a discharge collector, integral with the casing positioned to the rear of this exiting area. The collector is generally box-shaped and may be placed on the platform. It has an opening on its side surface opposite the rear exiting area of the blade casing and the entire collector is movable into and out of its position on the platform.

It is an advantage of this invention that the collector has a lower surface formed of a flexible material such as nylon. This flexible bottom surface of the collector conforms to the flat upper surface of the platform which is integral with the blade casing when the collector is placed in a position adjacent the platform and in the collecting position, but is designed to expand when the collector is removed from the platform. This expansion of the lower surface of the collector lowers the cuttings and debris which are held therein to a position below the front opening of the collector and prevents debris being discharged from the collector prematurely. When using this invention, the operator has merely to tilt the collector forward and to push the lower flexible surface inwardly when he desires the debris to be emitted from the collector.

It is also an advantage of this invention that the collector has means for preventing the obstruction of its entering orifice. Specifically, this is in the form of a baffle plate fixed to the collector's inner upper surface for preventing the cuttings or debris discharged from the exiting orifice of the blade casing from blocking this opening and the opening in the collector once the debris has entered the collector. When the baffle plate is used, the flexible bottom surface of the collector described above permits the operator to readily remove the debris and cuttings lodged behind the plate, debris which, otherwise, would be extremely difficult to remove. In this invention, the debris merely falls into the expandable pouch in the lower surface of the collector, away from the baffle, when the collector is raised upwardly away from the integral platform of the rotary mower. It is then a simple matter for the operator to empty the collector by tilting the collector forwardly and flexing the lower surface inwardly so as to force the contents out the opening in the forward surface of the collector.

In rotary mowers developed prior to this invention, the exiting area or discharge area of the blade casing was always placed in a forward position or on the side of the mower. This was necessary for the convenience of the operator so that debris from the rotary mower would not be cast into his path. Numerous catchers were developed which attached to these forward or side exiting areas of the mower, and were generally cumbersome bag arrangements which constantly impeded the mower's efficiency and usefulness by presenting too wide a profile for many yard areas. The tandem arrangement disclosed in this invention presents a narrow profile and thus permits access to many confined areas. Furthermore, the collector disclosed herein may be a metal basket which may be as wide as the mower itself, thus permitting far more efficient packing possibilities and reducing the number of times that the user must empty the catcher.

The flexible bags used in the prior art devices have proved to be extremely undesirable, especially when the user attempted to move the rotary mower in a rearward direction or to back out of a narrow enclosure. In these cases, the bags have been sometimes caught and destroyed under the wheels of the rotary. The collector disclosed in the present invention is fixed in position so that it is virtually impossible for it to be caught within the wheels of the rotary or destroyed by the blade whether the mower is being moved forward, backward or being turned.

Thus, none of the prior art devices have disclosed the tandem arrangement disclosed herein in combination with a firm metallic catcher having a flexible lower surface and, optionally, a baffle plate for collecting debris. The platform disclosed in this invention prevents the flexible lower surface of the collector from accidentally contacting the surface of the earth and provides a firm support for the cuttings and debris discharged into the collector. However, when the collector is removed, its lower surface then expands at a time when there is no danger that its flexibility will cause it to be caught in the wheels of the mower or engage a sharp object on the surface of the ground. Thus, this invention clearly removes the obvious dangers and obstructions to efficient operation inherent in the prior art devices.

Other objects and a fuller understanding of this invention may be had by referring to the following description and claims taken in conjunction with the accompanying drawings in which:

Figure 1:
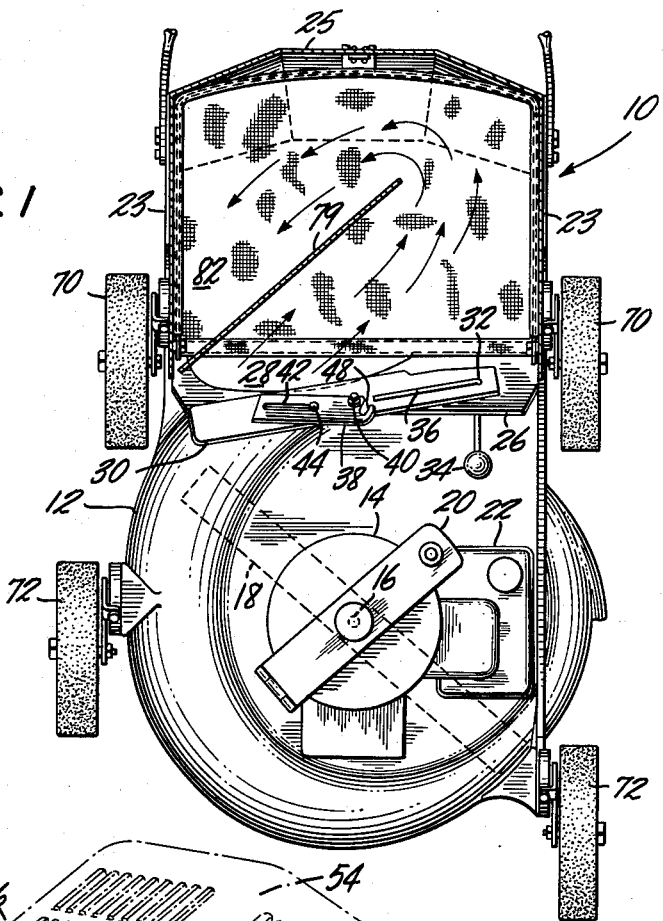
FIGURE 1 shows a partially cross-sectioned plan view of a rotary mower incorporating this invention.
Figure 4:
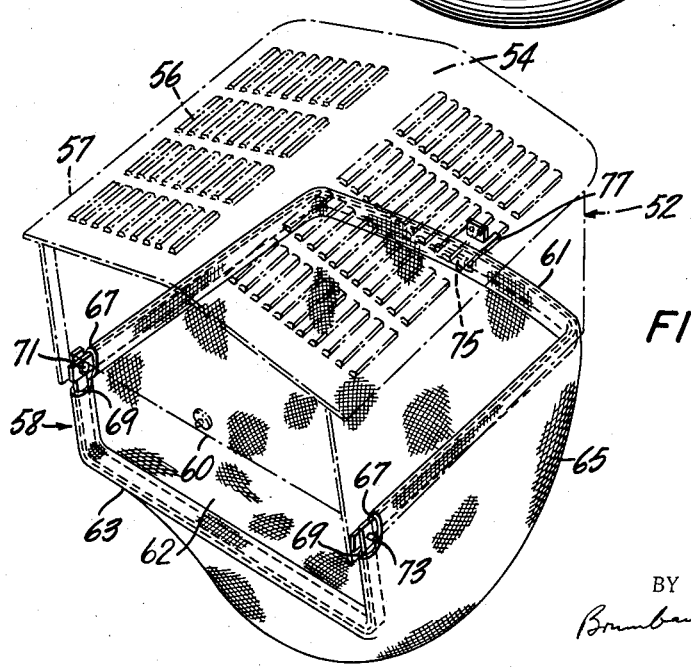
FIGURE 4 shows an isometric view of the flexible portion of the collector with the remaining structure being shown in phantom.

With reference to the drawings, the invention is illustrated as being incorporated in the rotary mower indicated generally by the reference character 10. As illustrated in FIG. 1, the rotary mower comprises a blade casing 12 having a volute shape upon which is mounted a conventional motor means 14 which is connected through a central shaft 16 to the rotary blade 18 positioned within the casing. A conventional starter 20 is shown positioned on motor 14 and a fuel tank 22 stores gasoline for use in the motor.

Figure 2:
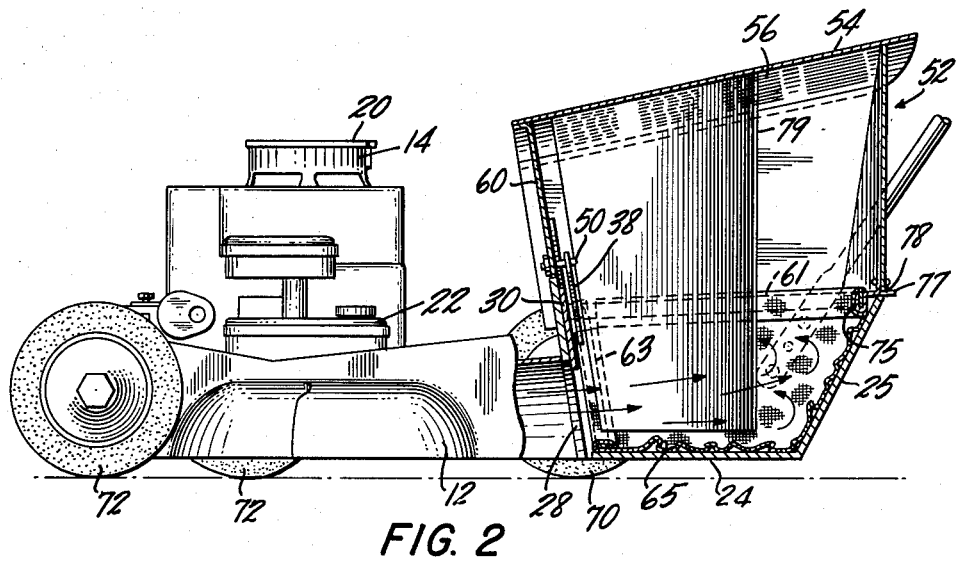
FIGURE 2 shows a partially cross-sectioned elevational view of the rotary mower of FIGURE 1 with arrows indicating the path of travel of the debris into the collector.

A rear platform 24 is positioned behind volute casing 12 and is shown clearly in FIG. 2 as being fabricated integrally therewith. The platform 24 has a generally horizontal base, to which side walls 23 and an inclined rear wall 25 are attached. The forward edge of the platform has a forward wall 26 which tilts forwardly and upwardly, generally away from the operator who would be pushing the mower. Plate 26 has an aperture 28 which connects directly with the chamber within the blade casing 12 and forms the exiting area therein.

Also attached to platform 24 are rear wheels 70 which are aligned generally along the same axis. These wheels operate in conjunction with staggered front wheels 72 to support the entire rotary mower.

A shutter 30 is pivotally mounted to tilted forward plate 26 and may be rotated about a pivot point 32 therein by rotating handle 34 which passes through the pivot point 32 and which is attached firmly to the shutter 30 along rod 36.

A locking plate 38 is also attached to forwardly tilted plate 26 by a fastener 40. This locking plate has an elongated slot 42 in which guide 44, which is firmly attached to shutter 30, moves. The shutter 30 also has a notch 46 to permit clearance of fastener 40 which is holding locking plate 38 in a rotatable position adjacent forwardly tilted plate 26. Locking plate 38 also has a notch 48 on one end, generally adjacent pivot point 40, which notch is designed to receive and hold stud 50 which projects from the inner surface of grass collector 52.

The collector 52 is shown, in the preferred embodiment, as a generally box-shaped container having a solid metal upper portion 54 composed of four side walls and a cover in which are a plurality of vents 56. The upper portion 54 of the collector 52 is attached firmly to the lower portion 58 which is composed generally of a horizontal rim supporting section 61 and a vertical rim supporting section 63 and a cloth portion 65 made preferably of nylon or a plastic fiber. The rim supporting sections 61 and 63 are C-shaped rings in the preferred embodiment. This flexible cloth portion 65 has two hemmed sections which are designed to receive the horizontal rim support 61 and the vertical rim support 63 through apertures 67 and 69, respectively.

The horizontal rim support 61 and vertical rim support 63 are fastened to the upper portion 54 of the collector 52 by fastening means 71 and 73, and the upper portion of horizontal support 61 is supported at the rear of the collector by the protruding portion 75 of aligning element 77. This aligning element 77 is designed to enter a small opening 78 in the upper portion of rear wall 25 which is attached to platform 24.

A baffle plate 79, as shown in FIG. 1, is attached to the upper portion of the collector 52, extending in a diagonal direction with respect to the directional axis of the rotary mower.

Figure 3:
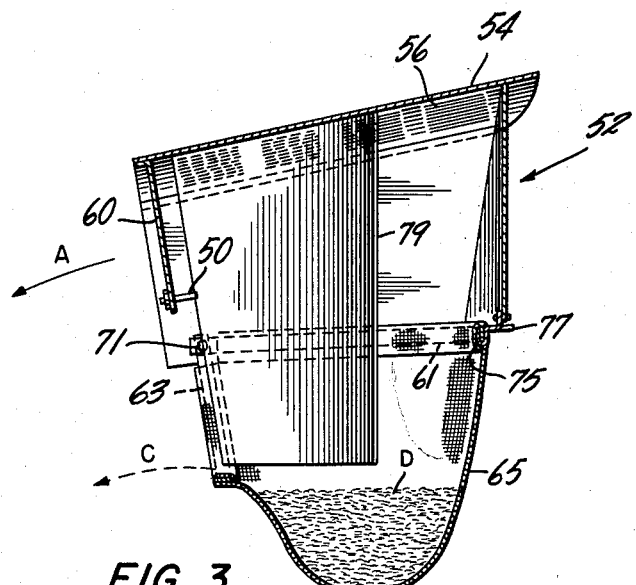
FIGURE 3 shows a cross-sectional elevational view of the collector after it has been removed from the rotary mower and indicates the method for discharging debris from the collector.

The stud 50 is fastened to the lower edge of solid forward wall 60 below which is located the opening 62 in the side wall of lower portion 58. Thus, the collector 52 is generally box-shaped with an opening in the lower half of its forward surface and with a flexible cloth 65 across its lower surface which can assume the shape of the floor of the platform 24 below it, as shown in FIG. 2 and which also can expand when filled with debris and cuttings when raised out of its collecting position, as shown in FIG. 3.

The grass collector is designed to fit within platform 24 with its open area adjacent the tilted forward plate 26 and opposite the discharge aperture 28 of the blade casing 12. In the preferred embodiment the lower section 58 fits totally within the side walls of platform 24 so that the solid upper portion 54 of collector 52 forms generally a continuous surface with the side walls 23 and the rear wall 25 of platform 24.

In operation, the motor 14, after being started by starter 20, causes the blade 18 to rotate clockwise within casing 12, as shown in FIG. 1. The blade 18 cuts the grass, leaves or otherwise substance in its path and the debris is swept up within the volute channel within the blade casing 12, being swept around toward exit aperture 28.

For the purposes of explaining the operation of this invention, it should be assumed that the grass collector 52 is locked in place in platform 24 and that the shutter 30 is in the open position, as shown in FIGS. 1 and 2 with the notch 48 of locking plate 38 engaging stud 50 on the inner cover of collector 52. Positioned in this manner, the debris from blade casing 12 is free to flow through aperture 28 into collector 52. The air passing through with the debris leaves the collector 52 through vents 56 on its upper surface, although the debris is retained.

The baffle plate 79 is positioned so that the aperture 28 in plate 26 is kept completely open and the debris exiting therethrough moves tangentially along the surface of this baffle plate until it is passed to the rear portion of the collector. At this point the debris falls and is stored in the sheltered area 82 behind the baffle plate 79.

The operator may continue to use the mower until the chamber within collector 52 is filled with debris, at which point he merely has to rotate the handle 34 in a clockwise direction. This rotates rod 36 and, in turn, rotates shutter 30 downwardly. Pivoting stud 44, being firmly attached to shutter 30, also rotates about the pivot 32 and begins to slide downwardly within the slot 42. This causes locking plate 38 to rotate about pivot 40. Likewise, the slot 48 rotates about pivot 40 until the shutter occupies a position closing aperture 28. At this point, stud 50 on the inner surface of collector 52 is free and the operator may lift collector 52, with its flexible lower section 58, out of platform 24 and discard the contents through opening 62 on its lower forward surface.

Specifically, when the collector has been removed from the platform 24 by the operator, the weight of the debris D, shown in FIG. 3, causes the lower flexible surface 65 of the collector to be flexed outwardly. This expansion of flexible surface 65 permits the debris stored behind baffle 79 to fall and be removed from this storage position. When the operator wishes to discharge the debris D, he merely tilts the entire collector in the direction indicated by arrow A and presses inwardly against flexible surface 65 in the direction shown by the arrow B, thereby forcing the debris D through exiting orifice 62 and outwardly along the path C. The collector shown in FIG. 3 contains only a small amount of debris for illustrative purposes, and it is to be understood that a collector completely filled with debris would be emptied in a similar manner by a series of successive inward strokes in the direction of the arrow B.

It should be emphasized that during this entire process, the motor 14 continues to turn blade 18 and that it is not necessary for the operator to turn off the motor as has been heretofore required in devices presently known. This is a swift, simple and safe operation with the operator being relieved of the requirement of starting the motor 14 and reclamping a grass collector onto the mower.

When the operator has emptied the contents of the collector 52, he merely places the collector back onto the platform 24 and into its operating position, as shown in FIG. 2. With the motor still running, he then merely rotates handle 34 in a counterclockwise direction forcing bar 36 and shutter 30 to rotate upwardly, causing pivot stud 44 to move upwardly in slot 42, and causing locking plate 38 to rotate counterclockwise around pivot 40 until stud 50 is firmly locked within notch 48. At this point, the shutter 30 will be in the open position, shown in FIG. 1, thereby allowing debris to flow freely from blade casing 12, through aperture 28 and into the collector.

Although the invention has been described with a certain degree of particularity, it is to be understood that the present disclosure has been made only by way of example and that numerous changes in the details of construction and the combination and arrangement of parts may be resorted to without departing from the spirit and scope of the invention as hereafter claimed.

I claim:
1. In a rotary mower,
a blade casing having an exiting area for cuttings,
a platform integral with the casing having an upper surface extending away from and below the exiting area of the casing, and
a collector having a rigid enclosed upper portion and a flexible lower portion, the lower portion including a horizontal generally C-shaped supporting element, a vertical generally C-shaped supporting element, means for fastening one end of each of the supporting elements together and to the upper portion at one point and the other ends of the supporting ele- ments together and to the upper portion at another point, whereby one supporting element is substantially horizontal and the other supporting element is substantially vertical, the vertical supporting element forming an opening in the collector, a flexible bottom surface and means on the perimeter of the bottom surface for engaging the two generally C-shaped supporting elements, the flexible bottom surface adapted to form a spacious scoop-shaped bag below the horizontally positioned supporting element and behind the vertically positioned supporting element, the collector being removably positioned on the platform with the opening in the collector placed adjacent the exiting area of the blade casing, the flexible bottom surface conforming to the upper surface of the platform when positioned adjacent thereto and expanding and lowering the cuttings when the collector is removed from the platform.

2. In a rotary mower,
a blade casing having an exiting area for cuttings,
a platform integral with the casing having an upper surface extending away from and below the exiting area of the casing, and
a collector having a rigid enclosed upper portion and a flexible lower portion, the lower portion including a vertically disposed generally C-shaped supporting element which is fastened at its ends to the upper portion and which forms an opening in the collector and a flexible bottom surface fastened at its perimeter to the generally C-shaped supporting element and the upper portion, the collector being removably positioned on the platform with the opening in the collector placed adjacent the exiting area of the blade casing, the flexible bottom surface conforming to the upper surface of the platform when positioned adjacent thereto and expanding and lowering the cuttings when the collector is removed from the platform.

References Cited by the Examiner
UNITED STATES PATENTS

| | | | |
|---|---|---|---|
| 474,234 | 5/92 | Even | 56—199 |
| 2,955,402 | 10/60 | Strasel | 56—202 X |

FOREIGN PATENTS 216,930  8/58  Australia.

ABRAHAM G. STONE, *Primary Examiner.*

RUSSELL R. KINSEY, T. GRAHAM CRAVER,
*Examiners.*